US011771190B1

(12) United States Patent
Yoon (10) Patent No.: US 11,771,190 B1
(45) Date of Patent: Oct. 3, 2023

(54) FOLDABLE MOBILE PHONE CASE HAVING CARD STORAGE STRUCTURE

(71) Applicant: Gwanggyu Yoon, Goyang-si (KR)

(72) Inventor: Gwanggyu Yoon, Goyang-si (KR)

( * ) Notice: Subject to any disclaimer, the term of this patent is extended or adjusted under 35 U.S.C. 154(b) by 0 days.

(21) Appl. No.: 17/966,334

(22) Filed: Oct. 14, 2022

(30) Foreign Application Priority Data

Apr. 19, 2022 (KR) .......................... 10-2022-0048298

(51) Int. Cl.
| | | |
|---|---|---|
| *A45C 11/18* | (2006.01) | |
| *A45C 13/00* | (2006.01) | |
| *A45C 13/36* | (2006.01) | |
| *H04B 1/3888* | (2015.01) | |
| *A45C 13/10* | (2006.01) | |
| *A45C 11/00* | (2006.01) | |

(52) U.S. Cl.
CPC .......... *A45C 11/182* (2013.01); *A45C 13/005* (2013.01); *A45C 13/1069* (2013.01); *A45C 13/36* (2013.01); *H04B 1/3888* (2013.01); *A45C 2011/002* (2013.01)

(58) Field of Classification Search
CPC . A45C 11/182; A45C 13/005; A45C 13/1069; A45C 13/36; A45C 2011/002; A45C 11/00; A45C 2011/003; A45C 2200/15; H04B 1/3888; H05K 5/0226; H05K 5/0004; H05K 5/0021; H05K 5/0086; G06F 1/1647; G06F 1/1656; G06F 1/1686; G06F 1/1616; G06F 2200/1633; H04M 1/022; H04M 1/185; H04M 1/0268; H04M 1/04; H04M 1/021; H04M 1/0214
See application file for complete search history.

(56) References Cited

U.S. PATENT DOCUMENTS

| | | | | |
|---|---|---|---|---|
| 10,256,860 | B2 * | 4/2019 | Chung | ................ A45C 11/182 |
| 2018/0139857 | A1 * | 5/2018 | Cavenagh | ............ H04B 1/3888 |

FOREIGN PATENT DOCUMENTS

| | | |
|---|---|---|
| KR | 20-2012-0001165 U | 2/2012 |
| KR | 10-1956481 B1 | 3/2019 |
| KR | 10-2228224 B1 | 3/2021 |
| KR | 10-2021-0110528 A | 9/2021 |
| KR | 10-2346022 B1 | 1/2022 |
| KR | 10-2022-0014893 A | 2/2022 |

OTHER PUBLICATIONS

Decision to grant patent for KR 10-2022-0048298 dated Jul. 5, 2022.
Notice of submission of opinion for KR 10-2022-0048298 dated Jun. 20, 2022.

* cited by examiner

*Primary Examiner* — Lester G Kincaid
*Assistant Examiner* — Maryam Soltanzadeh
(74) *Attorney, Agent, or Firm* — Sughrue Mion, PLLC (57) ABSTRACT

Disclosed is a foldable mobile phone case including a card storage structure including an upper body part, a lower body part, a card storage part having a structure recessed by a predetermined depth in the same shape as a card to be stored inside the lower body part and in which a card inlet port is formed at a position in contact with the upper body part, and a hinge cover part having a structure mounted to be rotatable in one side direction by a hinge structure at a lower end of the upper body part, is mounted to surround a hinge part of the mobile phone when the mobile phone is folded, and is rotated outward by a hinge structure and opens a hinge portion of the mobile phone when the mobile phone is unfolded.

4 Claims, 13 Drawing Sheets

FOLDABLE MOBILE PHONE CASE HAVING CARD STORAGE STRUCTURE

CROSS-REFERENCE TO RELATED APPLICATION

This application claims priority to and the benefit of Korean Patent Application No. 10-2022-0048298 filed Apr. 19, 2022, the entire disclosure of which is incorporated herein by reference in its entirety.

BACKGROUND

1. Field of the Invention

The present disclosure relates to a foldable mobile phone case including a card storage structure, and more particularly, to a foldable mobile phone case including a structure capable of safely protecting a hinge portion of a foldable mobile phone and, at the same time, stably accommodating a plurality of cards.

2. Discussion of Related Art

In general, mobile terminals are telecommunication terminals that may be easily used in a hand while being carried by a user, modern people carry the mobile terminals as almost essential items, and front displays of the mobile terminals are manufactured using glass substrates. The front displays are constantly damaged as the mobile terminals are dropped, and the users should spend time and money to replace the front displays.

Thus, cases for protecting mobile terminals such as smart phones and tablet personal computers (PCs) have appeared, and in recent years, the cases have been used not only for simple protection but also for producing various functions and designs.

Further, in recent years, foldable mobile terminals in which flexible displays using not glass substrates but plastic substrates are applied to displays of the mobile terminals have been developed, and the flexible displays are products which can additionally have flexibility to be folded or bent in a desired shape as well as implement the same image quality even in this case.

Further, the flexible displays are thin and light, are strong on impact, may be bent or folded, and thus may be manufactured in various shapes, and may be used in industrial fields in which the application of the existing glass substrate displays is limited or impossible.

For example, the flexible displays may be utilized in new mobile information technology (IT) product fields such as electronic books that may replace publications such as magazines, textbooks, books, and cartoons, ultra-compact PCs that may be carried while displays thereof are folded or rolled, and smart cards that may identify real-time information. In addition, since flexible plastic substrates are used, the flexible displays are products that may be extendedly applied to clothing fashion and medical diagnostic fields.

Figure 1:
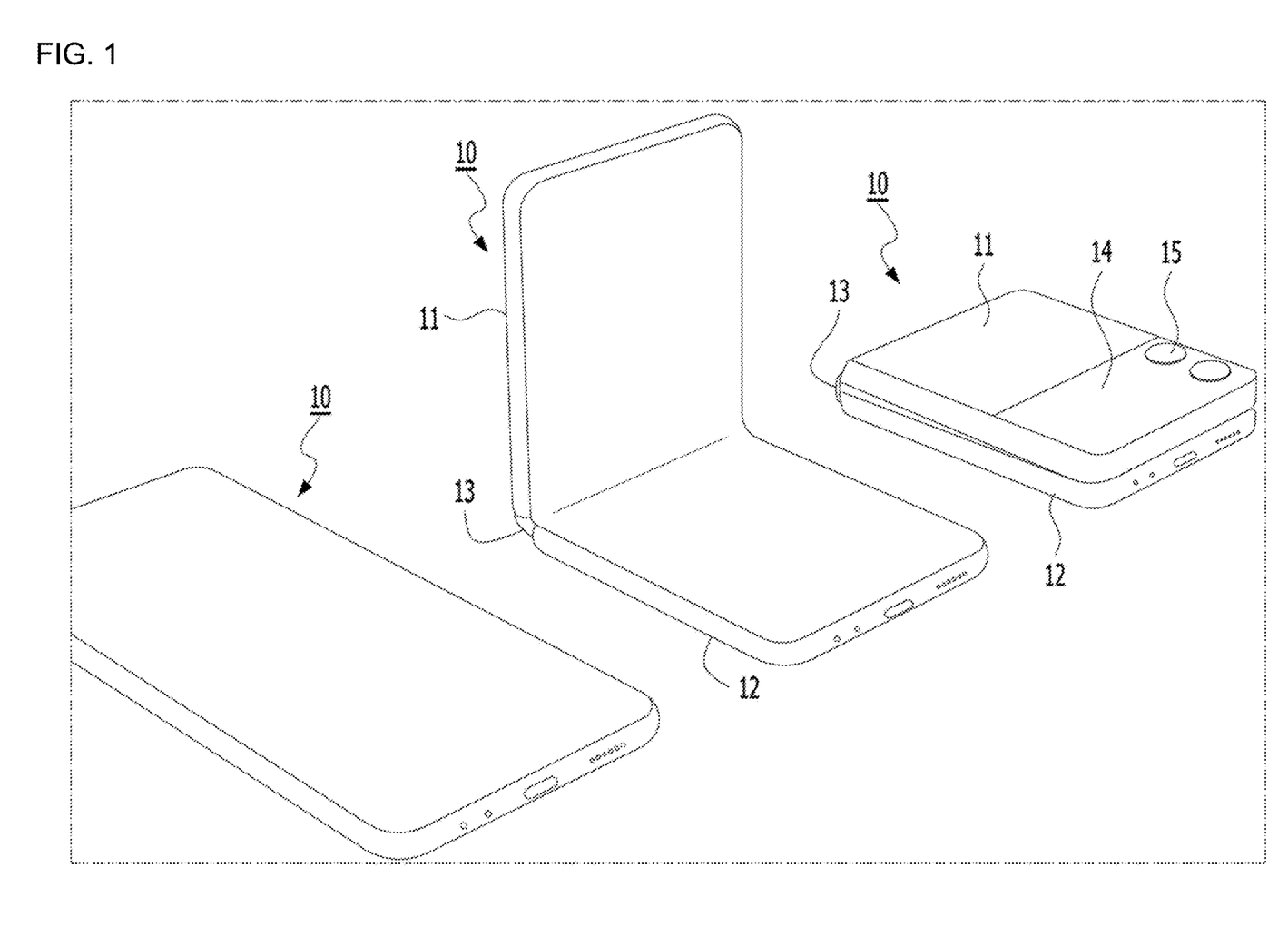
FIG. 1 is a picture illustrating a mobile phone of which a central portion is foldable.

However, when only a foldable mobile terminal (see FIG. 1) having the flexible display is carried, the display may be easily damaged by pressing, scratching, or the like. Thus, a protective case is mounted only on the remaining portion except for a folded portion of the foldable mobile terminal due to foldable or bendable characteristics, but a separate case cannot be mounted on the folded portion due to deformation, and thus the folded portion cannot be protected from scratches and impacts.

Further, the foldable mobile terminal is mounted not to cover the entire rear surface as in a protective case of a conventional mobile terminal but covers one side of upper, lower, left, and right sides of a rear surface of a front side and a rear side except for the folded portion. Thus, the protective case may be separated while moving in either leftward or rightward direction.

Figure 2:
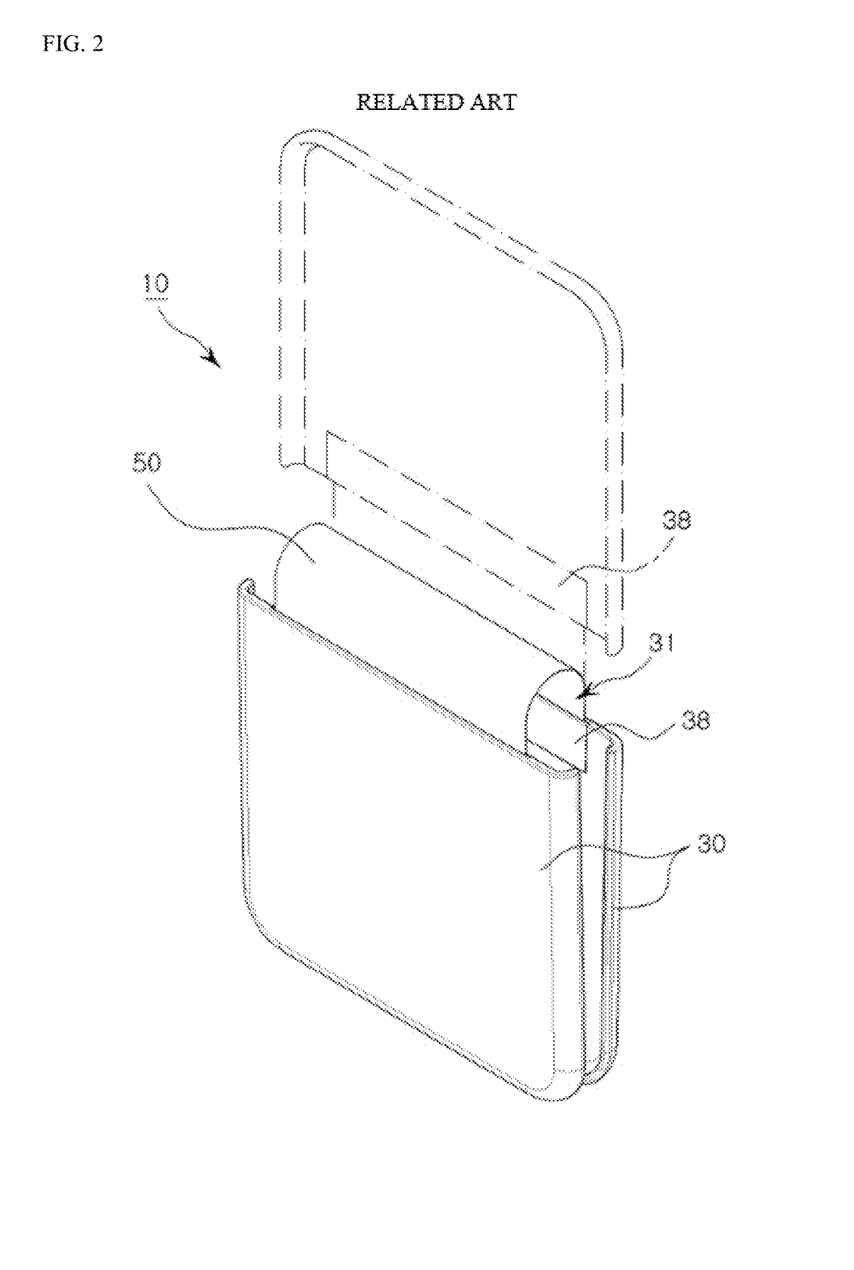
FIG. 2 is a perspective view illustrating a mobile phone case for a foldable mobile phone according to a related art.

In order to solve this problem, a mobile phone case having a structure illustrated in FIG. 2 has been developed.

In the case of the conventional mobile phone case illustrated in FIG. 2, a plurality of case covers 30 are connected using a leaf spring 50 and are then mounted on an outer surface of the mobile phone.

The conventional mobile phone case illustrated in FIG. 2 may be detached from the mobile phone while folded or unfolded. Further, in the conventional mobile phone case illustrated in FIG. 2, since only a structure covering the outer surface of the mobile phone is adopted, undesired impacts applied from the outside cannot be effectively absorbed, the impacts applied from the outside are transmitted to the mobile phone, and thus the mobile phone may be damaged. Further, the conventional mobile phone case illustrated in FIG. 2 has a very simple structure in which a card desired by a user cannot be accommodated.

Thus, a technology that can solve the above-described problems according to the related art is required.

RELATED ART DOCUMENT

Patent Document (Patent Document 0001) Korean Patent Registration No. 10-1956481 (Registration Date: Mar. 4, 2019)

SUMMARY OF THE INVENTION

The present disclosure is directed to providing a foldable mobile phone case in which a mobile phone having a foldable central portion may be stably mounted thereon, a hinge part of the mobile phone may be stably protected even while a folding or unfolding motion is performed, and a card may be stably stored therein so that the card is not lost due to an unintentional external force.

According to an aspect of the present disclosure, there is provided a foldable mobile phone case including a card storage structure, including an upper body part having a structure that is mounted to surround an upper mobile phone portion, in which a camera lens is positioned, based on a foldable portion of a to-be-mounted mobile phone, a lower body part having a structure that is mounted to surround a lower mobile phone portion on another side, on which the upper body part is not mounted, based on the foldable portion of the to-be-mounted mobile phone, a card storage part having a structure which is recessed by a predetermined depth in the same shape as a card to be stored inside the lower body part and in which a card inlet port is formed at a position in contact with the upper body part, and a hinge cover part having a structure that is mounted to be rotatable in one side direction by a hinge structure at a lower end of the upper body part, is mounted to surround a hinge part of the mobile phone when the mobile phone is folded, and is rotated outward by a hinge structure and opens a hinge portion of the mobile phone when the mobile phone is unfolded.

The upper body part may include an upper inner surface having a structure that constitutes a storage space having a predetermined volume and is mounted to surround an upper portion of the to-be-mounted mobile phone, a lens exposure portion having a structure in which a hole is formed to pass through one surface so that the camera lens of the to-be-mounted mobile phone is exposed to the outside, and a button exposure portion having a structure in which a portion is formed to be recessed in one surface so that a button formed on a lateral side of the to-be-mounted mobile phone is exposed to the outside.

The lower body part may include a lower inner surface that constitutes a storage space having a predetermined volume and is mounted to surround a lower portion of the to-be-mounted mobile phone, a terminal exposure portion having a structure in which a hole is formed to pass through one surface so that a charging terminal of the to-be-mounted mobile phone is exposed to the outside, a recessed groove having a structure that extends in an extension lengthwise direction of the lower body part along both sides of the card storage part formed on the lower inner surface and is recessed by a predetermined depth, and a reinforcement portion having a structure that is fixedly seated on the recessed groove, extends to an edge of the lower inner surface, and surrounds a lower edge portion of the to-be-mounted mobile phone.

The reinforcement portion may include a reinforcement body portion having a structure that is seated on the recessed groove, a reinforcement extension portion having a structure that is integrated with the reinforcement body portion, extends to the edge of the lower inner surface, and surrounds the lower edge portion of the to-be-mounted mobile phone, and a card separation prevention reinforcement protrusion portion having a structure that is integrated with the reinforcement body portion, extends inward form the card storage part by a predetermined length, and presses and fixes both sides of a card stored in the card storage part.

The hinge cover part may include a hinge cover body portion having a structure that has an end corresponding to one end of each of the upper body part and the lower body part and surrounds the hinge portion of the to-be-mounted mobile phone, a hinge binding portion that extends from one end of the hinge cover body portion in an integral structure by a predetermined length, is mounted to be rotatable by a predetermined angle with respect to one end of the upper body portion, and is made of a material having an elastic restoring force having a predetermined magnitude, an elastic deformation recess portion that is formed in an outer surface of the hinge binding portion, is recessed by a predetermined depth, and induces outward elastic deformation of the hinge binding portion, a first magnetic member that is mounted on the other end of the hinge cover body portion, is attached to a second magnetic member mounted on one end of the lower body part by a magnetic force, and attaches the hinge cover part to the lower body part in a detachable form, and a withdrawal groove sealing portion having a structure that extends from the other end of the hinge cover body portion in an integral structure by a predetermined length and corresponds to a card withdrawal groove.

The upper body part may include a hinge mounting groove that is symmetrically formed on both sides of one end of the upper body part, has a groove structure that is recessed by a predetermined depth and extends upward by a predetermined length, and has a structure that is bound to the hinge binding portion in a form that changes a vertical position of the hinge binding portion of the hinge cover part.

The lower body part may include a second magnetic member that is mounted on one end of the lower body part, is disposed at a position in contact with the first magnetic member, and has a polarity different from that of the first magnetic member, and the card withdrawal groove that is formed adjacent to the card inlet port formed at one end of the lower body part.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. Prior to this, the terms or words used in the present specification and the appended claims should not be interpreted as being limited to conventional or dictionary meanings, but should be interpreted as meanings and concepts consistent with the technical spirit of the present disclosure.

Throughout the present specification, when a first member is positioned "on" a second member, this case includes not only a case in which the first member is in contact with the second member but also a case in which a third member is present between the two members. Throughout the present specification, when a part "includes" a component, this means that another component is not excluded but may be further included unless otherwise stated.

Figure 3:
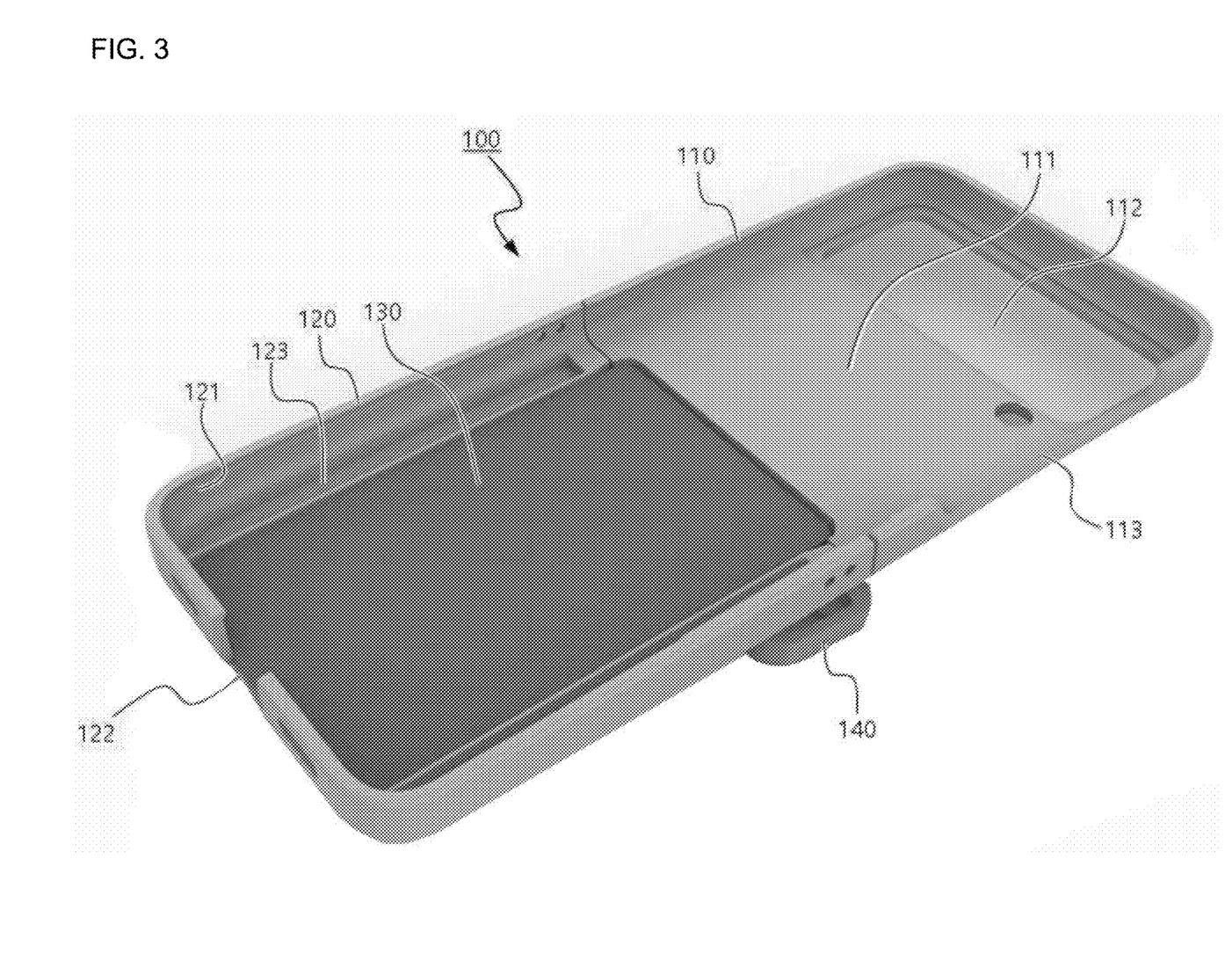
FIG. 3 is a perspective view illustrating a foldable mobile phone case according to an embodiment of the present disclosure.
Figure 4:
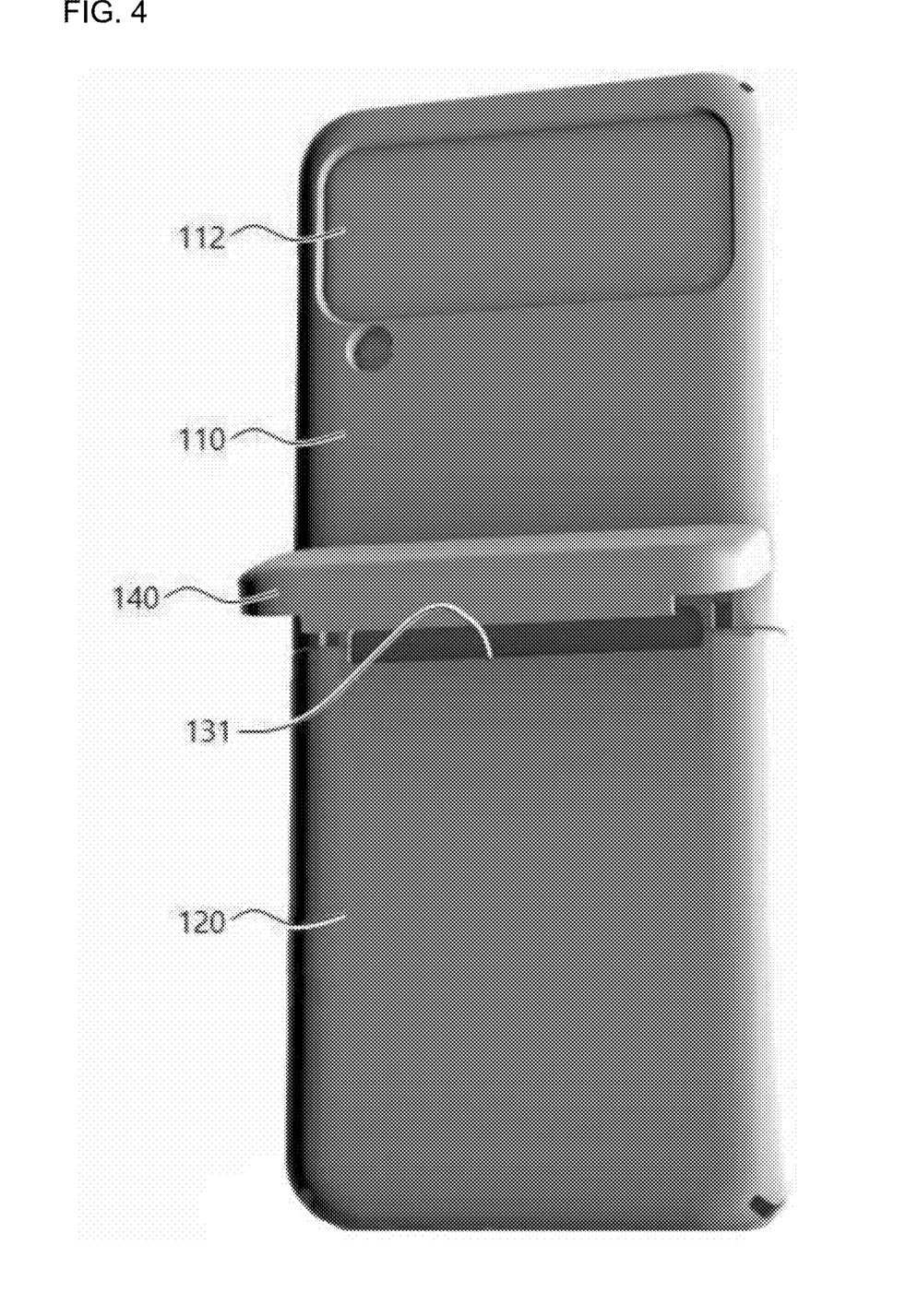
FIG. 4 is a perspective view illustrating a rear surface of the foldable mobile phone case illustrated in FIG. 3.

FIG. 3 is a perspective view illustrating a foldable mobile phone case according to an embodiment of the present disclosure, and FIG. 4 is a perspective view illustrating a rear surface of the foldable mobile phone case illustrated in FIG. 3.

Referring to these drawings, a foldable mobile phone case 100 according to the present embodiment including an upper body part 110, a lower body part 120, a card storage part 130, and a hinge cover part 140 having specific structures can be provided, a mobile phone having a foldable central portion can be stably mounted thereon, a hinge part of the mobile phone can be stably protected even while a folding or unfolding motion is performed, and a card can be stably stored therein so that the card is not lost due to an unintentional external force.

Hereinafter, each component constituting the foldable mobile phone case 100 according to the present embodiment will be described in detail with reference to the drawings.

Figure 5:
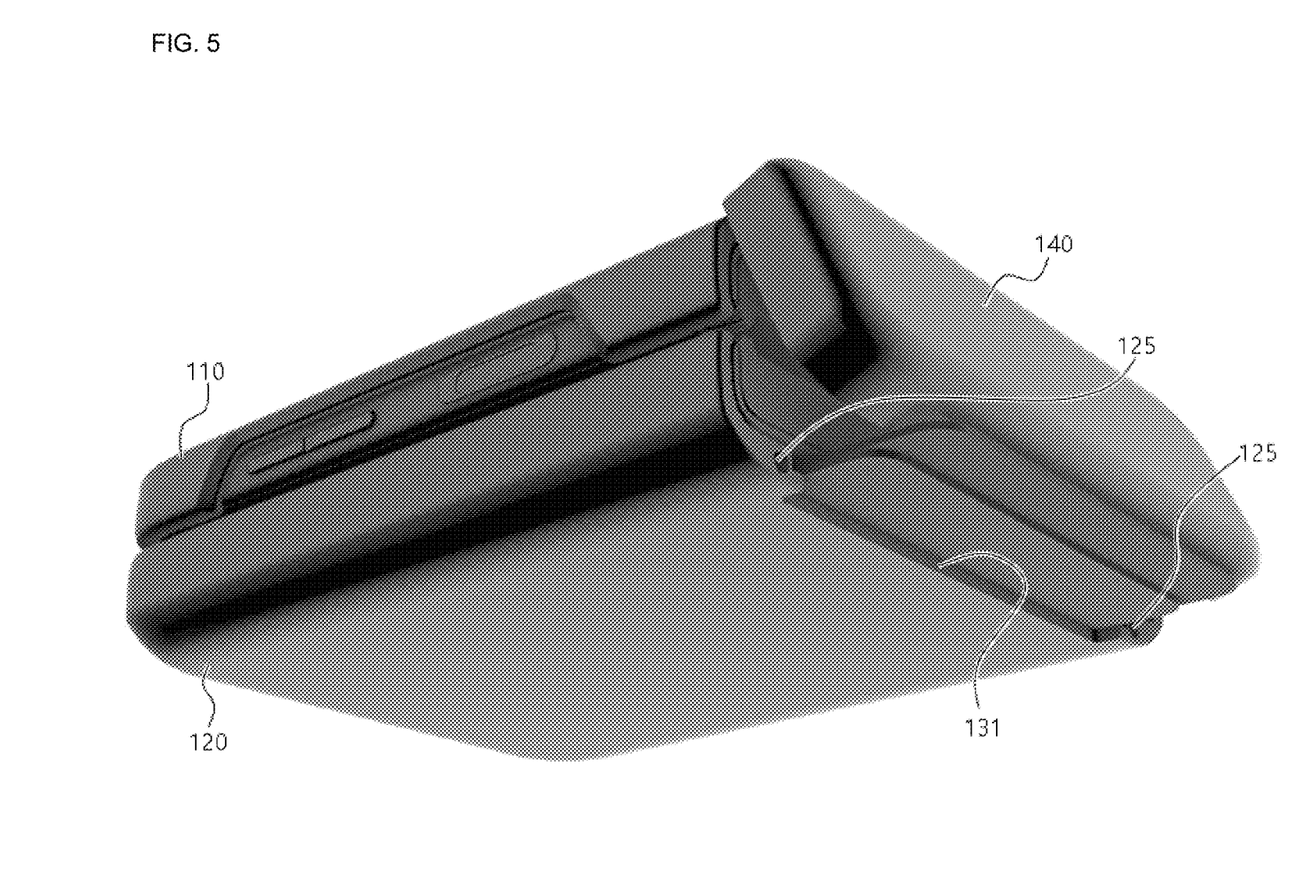
FIG. 5 is a perspective view illustrating a state in which two cards are accommodated in a card storage part in a state in which a foldable mobile phone is mounted on the foldable mobile phone case illustrated in FIG. 3.
Figure 6:
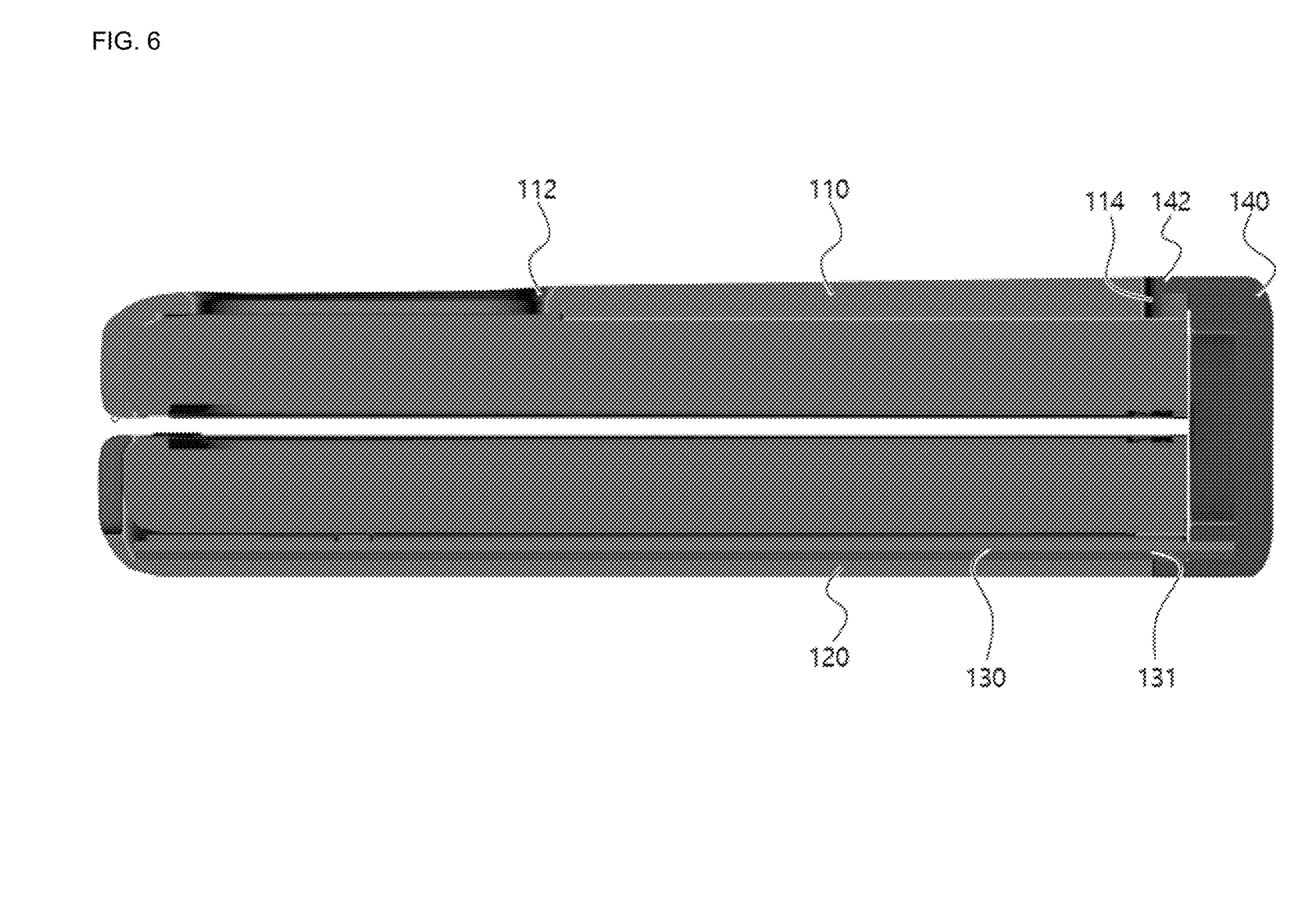
FIG. 6 is a longitudinal cross-sectional view illustrating a state in which a mobile phone is mounted on the foldable mobile phone case according to an embodiment of the present disclosure.

FIG. 5 is a perspective view illustrating a state in which two cards are accommodated in a card storage part in a state in which a foldable mobile phone is mounted on the foldable mobile phone case illustrated in FIG. 3, and FIG. 6 is a longitudinal cross-sectional view illustrating a state in which a mobile phone is mounted on the foldable mobile phone case according to an embodiment of the present disclosure.

The upper body part 110 of the foldable mobile phone case 100 according to the present embodiment may have a structure that is mounted to surround an upper mobile phone portion 11 in which a camera lens is positioned based on a foldable portion of a to-be-mounted mobile phone 10.

In detail, the upper body part 110 may include an upper inner surface 111, a lens exposure portion 112, and a button exposure portion 113 having specific structures. The upper inner surface 111 of the upper body part 110 may have a structure that constitutes a storage space having a predetermined volume and is mounted to surround an upper portion of the to-be-mounted mobile phone. The lens exposure portion 112 may have a structure in which a hole is formed to pass through one surface so that the camera lens of the to-be-mounted mobile phone may be exposed to the outside. The button exposure portion 113 may have a structure in which a portion is formed to be recessed in one surface so that a button formed on a lateral side of the to-be-mounted mobile phone may be exposed to the outside.

The lower body part 120 of the foldable mobile phone case 100 according to the present embodiment may have a structure that is mounted to surround a lower mobile phone portion 12 on another side, on which the upper body part 110 is not mounted, based on the foldable portion of the to-be-mounted mobile phone 10.

In detail, the lower body part 120 may include a lower inner surface 121, a terminal exposure portion 122, a recessed groove 123, and a reinforcement portion 124 having specific structures. The lower inner surface 121 of the lower body part 120 may have a structure that constitutes a storage space having a predetermined volume and is mounted to surround a lower portion of the to-be-mounted mobile phone. The terminal exposure portion 122 may have a structure in which a hole is formed to pass through one surface so that a charging terminal of the to-be-mounted mobile phone may be exposed to the outside. The recessed groove 123 may have a structure that extends in an extension lengthwise direction of the lower body part 120 along both sides of the card storage part 130 formed on the lower inner surface 121 and is recessed by a predetermined depth. The reinforcement portion 124 has a configuration that is fixedly seated on the recessed groove 123 and may have a structure that extends to an edge of the lower inner surface 121 and surrounds a lower edge portion of the to-be-mounted mobile phone.

In this case, according to the present embodiment, since the mobile phone case including the upper body part 110 including the upper inner surface 111, the lens exposure portion 112, and the button exposure portion 113 having specific structures and the lower body part 120 including the lower inner surface 121, the terminal exposure portion 122, the recessed groove 123, and the reinforcement portion 124 can be provided, the mobile phone having the foldable central portion can be stably mounted thereon and the hinge part of the mobile phone can be stably protected even while the folding or unfolding motion is performed.

Figure 7:
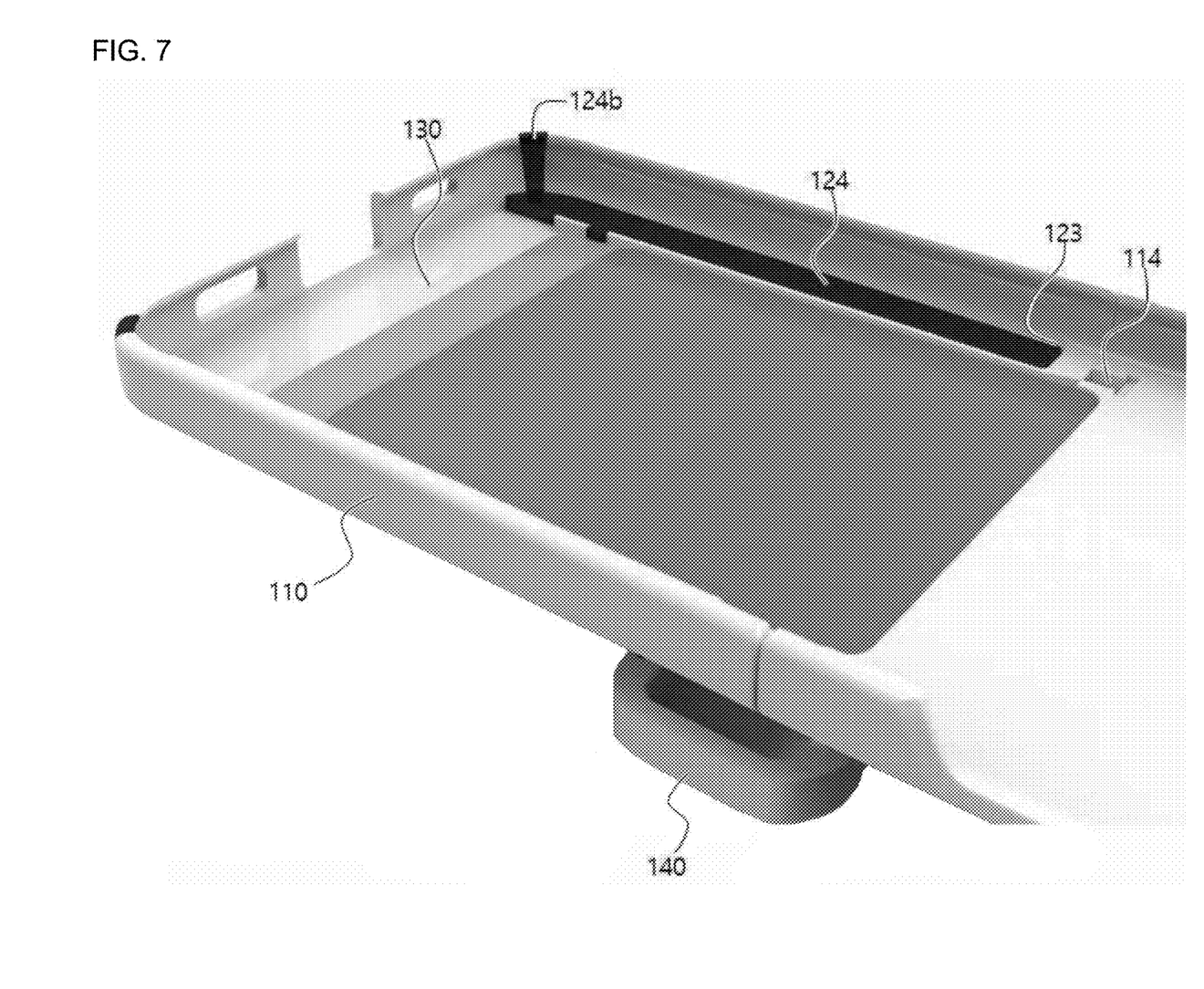
FIG. 7 is a perspective view illustrating the card storage part of the foldable mobile phone case according to an embodiment of the present disclosure.
Figure 8:
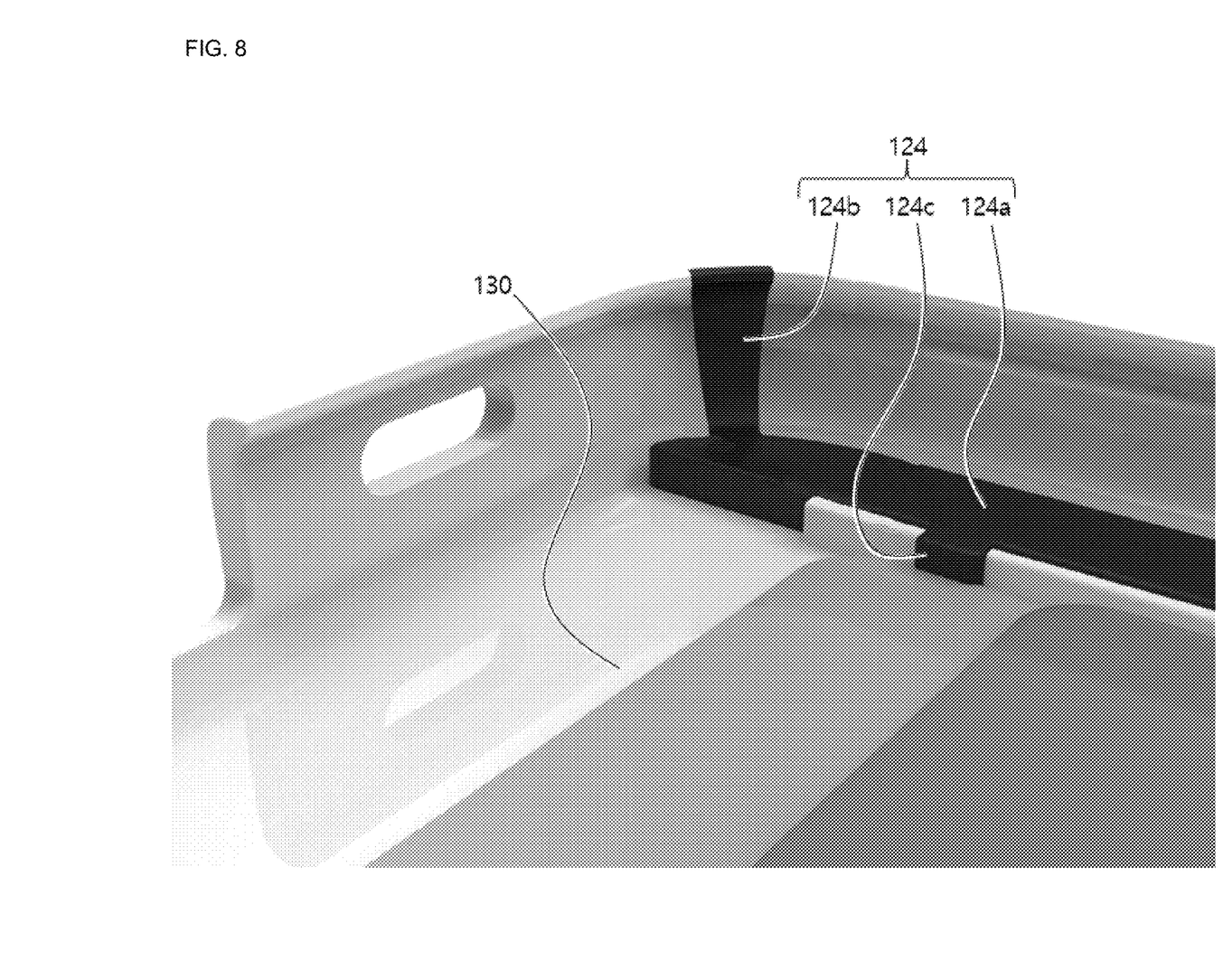
FIG. 8 is a partially enlarged view illustrating the card storage part illustrated in FIG. 7 and a reinforcement portion.

FIG. 7 is a perspective view illustrating the card storage part of the foldable mobile phone case according to an embodiment of the present disclosure, and FIG. 8 is a partially enlarged view illustrating the card storage part illustrated in FIG. 7 and a reinforcement portion.

Referring to these drawings, the reinforcement portion 124 according to the present embodiment may include a reinforcement body portion 124a, a reinforcement extension portion 124b, and a card separation prevention reinforcement protrusion portion 124c having specific structures.

In detail, the reinforcement body portion 124a of the reinforcement portion 124 may have a structure that is seated on the recessed groove 123. The reinforcement extension portion 124b is a component integrated with the reinforcement body portion 124a and may have a structure that extends to the edge of the lower inner surface 121 and surrounds the lower edge portion of the to-be-mounted mobile phone. Further, the card separation prevention reinforcement protrusion portion 124c is a component integrated with the reinforcement body portion 124a and may have a structure that extends inward form the card storage part 130 by a predetermined length and presses and fixes both sides of a card stored in the card storage part 130.

In this case, according to the present embodiment, since the foldable mobile phone case including the reinforcement body portion 124a, the reinforcement extension portion 124b, and the card separation prevention protrusion portion 124c having specific structures can be provided, the card stored in the card storage part 130 can be prevented from being separated to the outside, the card storage part 130 formed inside the lower body part 120 can be stably supported due to an external force applied from the outside by reinforcing an internal structure of the lower body part 120, and as a result, the card stored in the card storage part 130 can be stably stored and kept.

Figure 9:
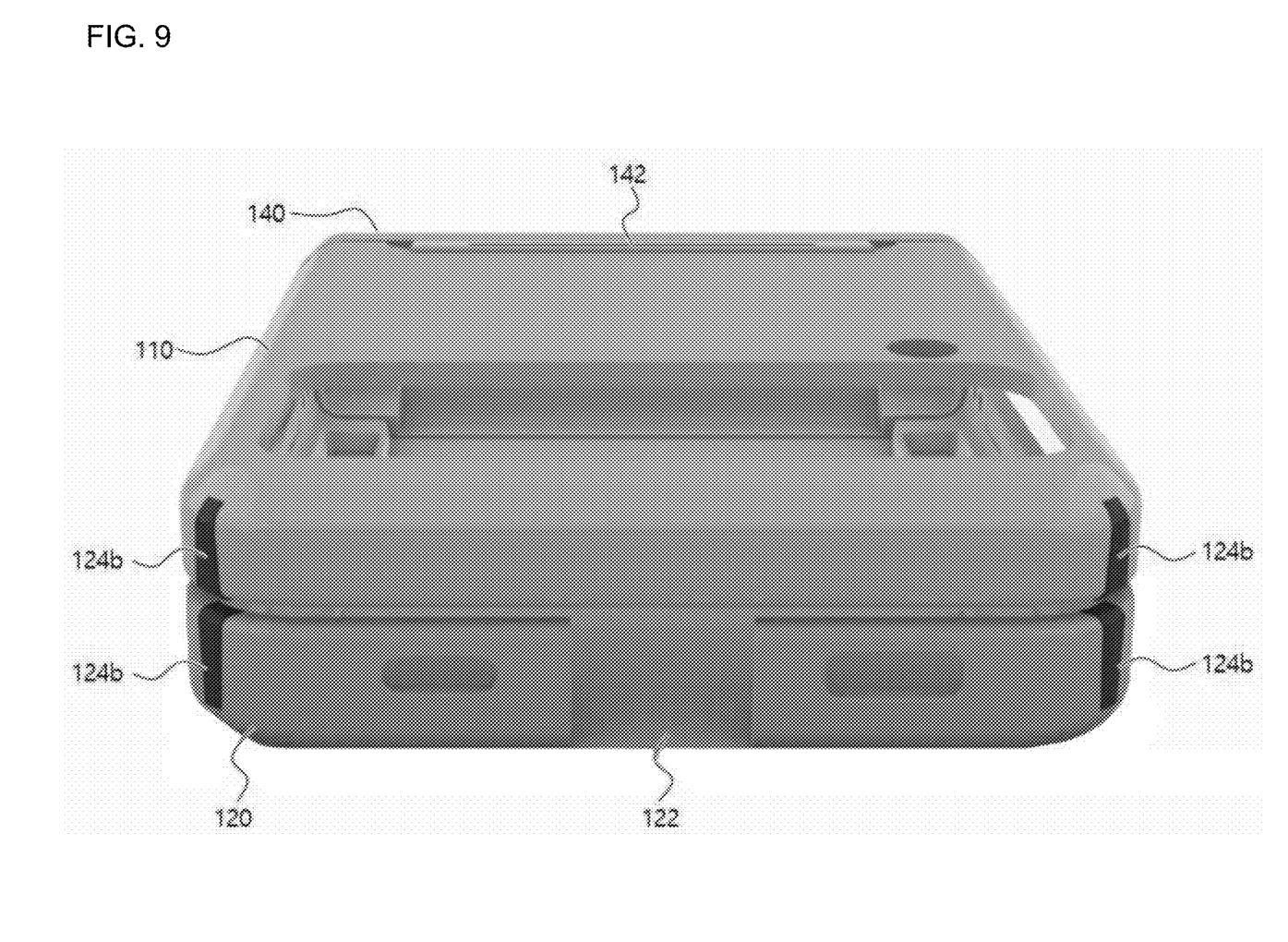
FIG. 9 is a perspective view illustrating a state in which the foldable mobile phone case according to an embodiment of the present disclosure is folded.
Figure 10:
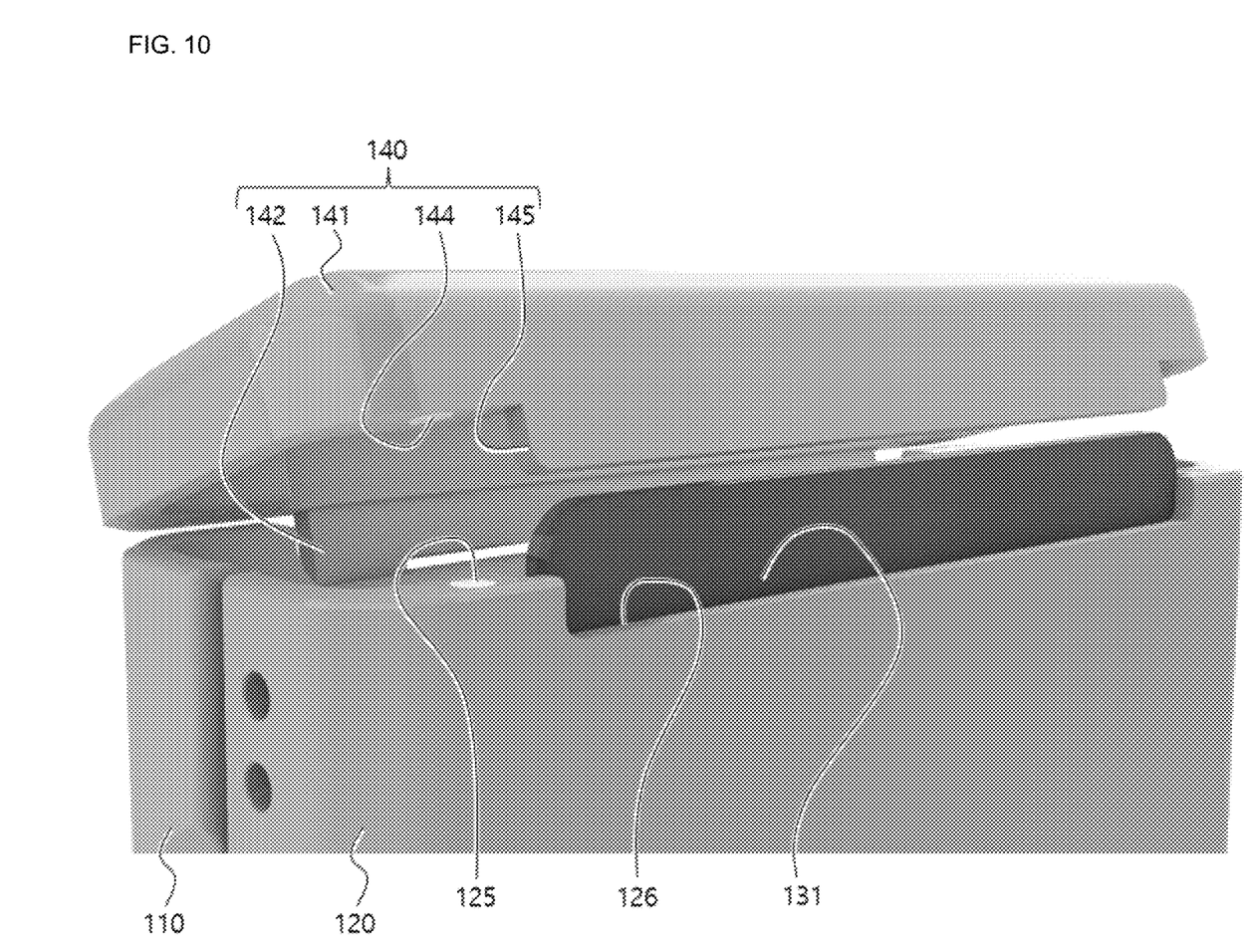
FIG. 10 is a partially enlarged view illustrating a hinge cover part of the foldable mobile phone case according to an embodiment of the present disclosure.
Figure 11:
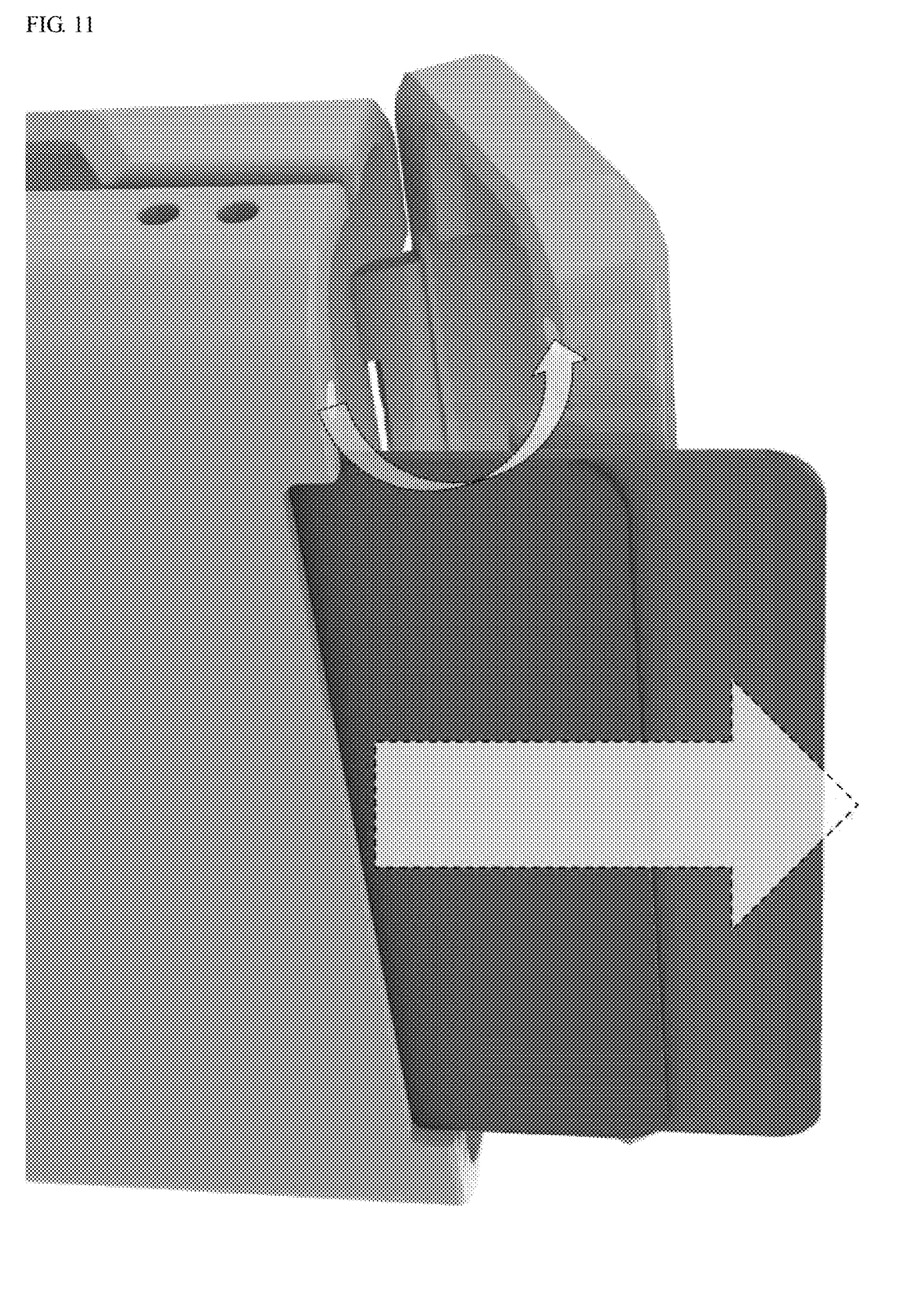
FIG. 11 is a perspective view illustrating a state in which a card stored in the card storage part is withdrawn to the outside using a card withdrawal groove after the hinge cover part illustrated in FIG. 10 is opened.
Figure 12:
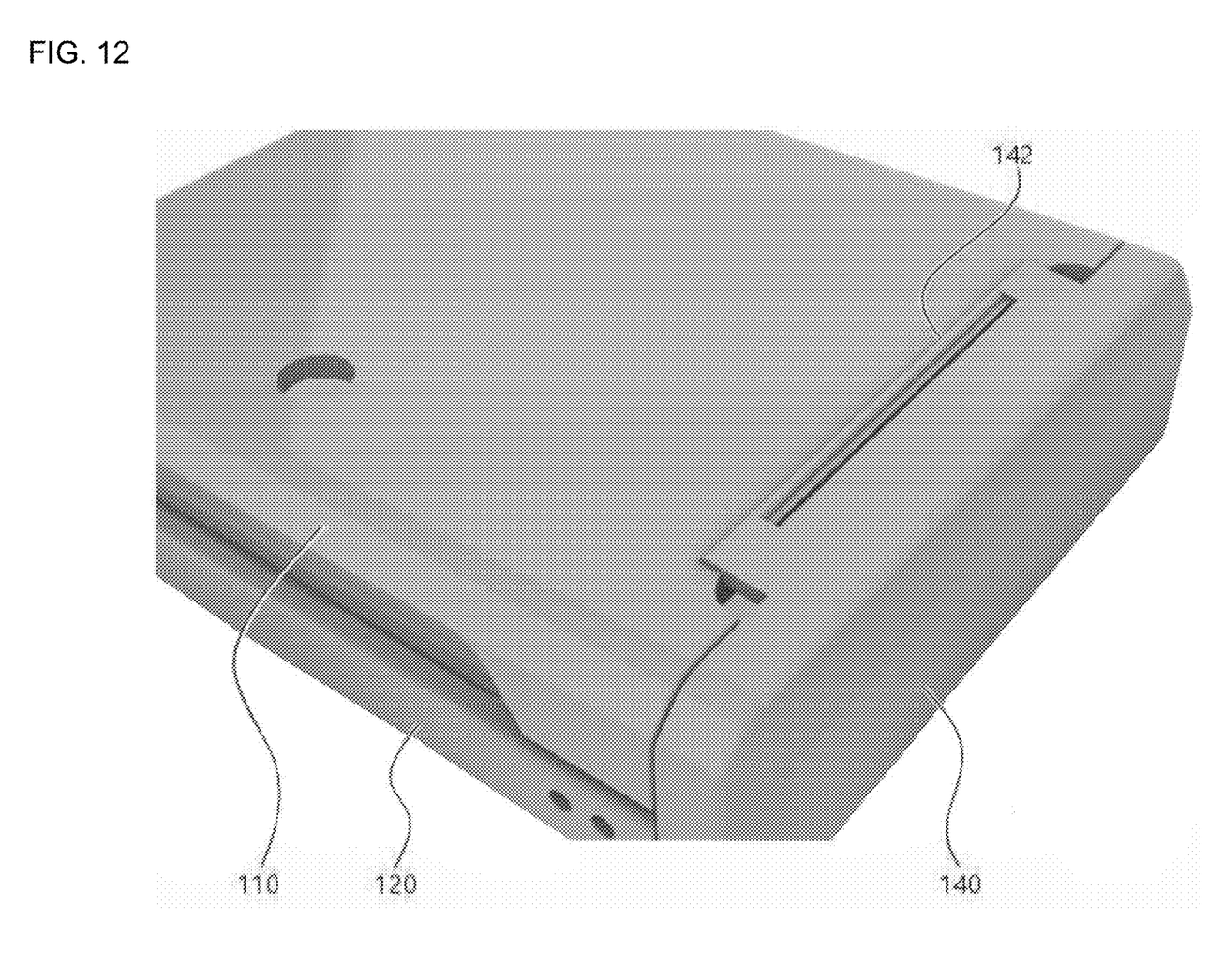
FIG. 12 is a perspective view illustrating the hinge cover part of the foldable mobile phone case according to an embodiment of the present disclosure.
Figure 13:
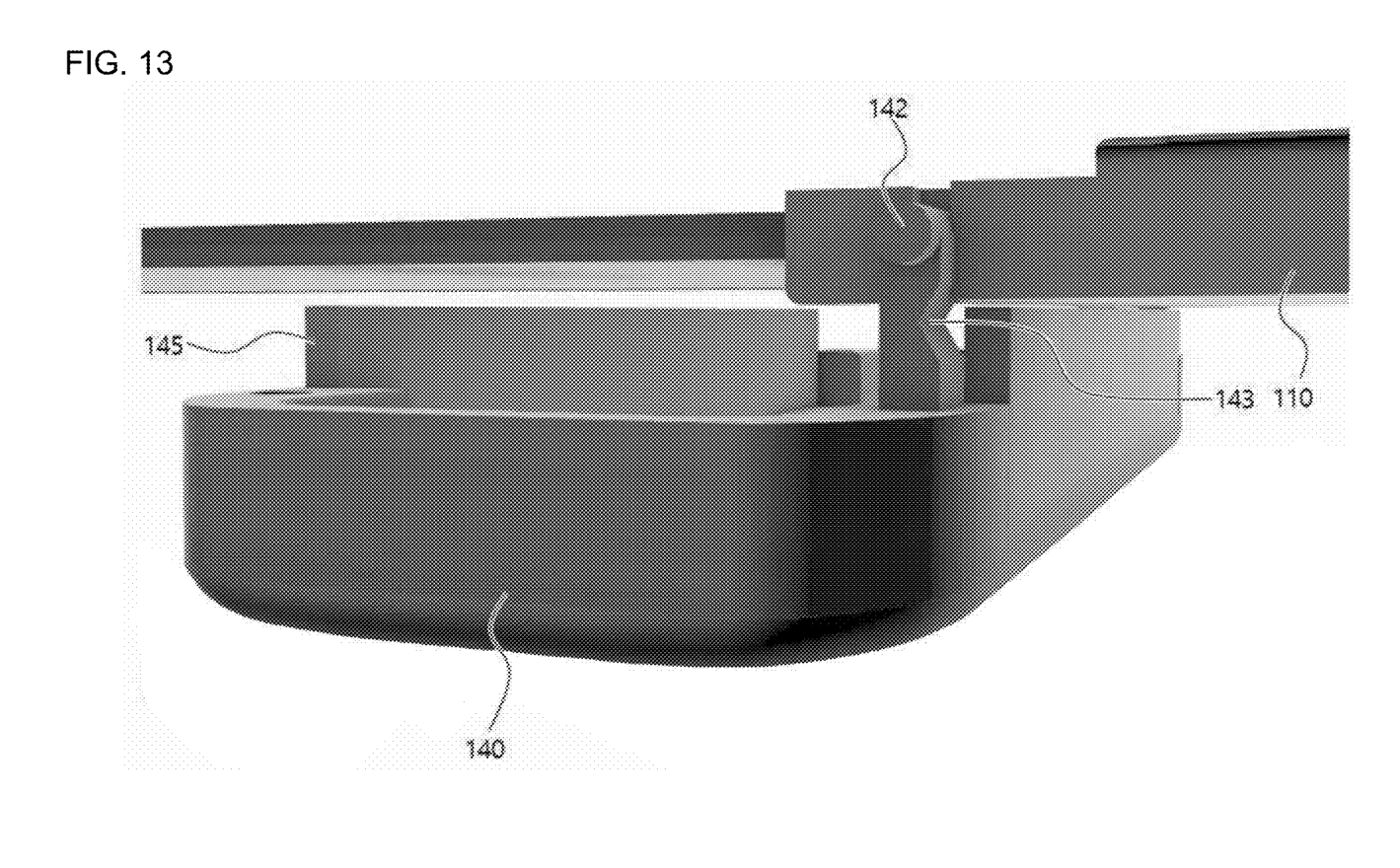
FIG. 13 is a partially enlarged view illustrating a hinge binding portion of the hinge cover part according to an embodiment of the present disclosure.

FIG. 9 is a perspective view illustrating a state in which the foldable mobile phone case according to an embodiment of the present disclosure is folded, FIG. 10 is a partially enlarged view illustrating a hinge cover part of the foldable mobile phone case according to an embodiment of the present disclosure, and FIG. 11 is a perspective view illustrating a state in which a card stored in the card storage part is withdrawn to the outside using a card withdrawal groove after the hinge cover part illustrated in FIG. 10 is opened. Further, FIG. 12 is a perspective view illustrating the hinge cover part of the foldable mobile phone case according to an embodiment of the present disclosure, and FIG. 13 is a partially enlarged view illustrating a hinge binding portion of the hinge cover part according to an embodiment of the present disclosure.

Referring to these drawings, the card storage part 130 of the foldable mobile phone case 100 according to the present embodiment may have a structure that is recessed by a predetermined depth in the same shape as a card to be stored inside the lower body part 120 and may have a structure in which a card inlet port 131 is formed at a position in contact with the upper body part 110.

The hinge cover part 140 of the foldable mobile phone case 100 according to the present embodiment may have a structure that is mounted to be rotatable in one side direction by a hinge structure at a lower end of the upper body part 110, is mounted to surround a hinge part 13 of the mobile phone when the mobile phone is folded, and is rotated outward by a hinge structure and opens a hinge portion of the mobile phone when the mobile phone is unfolded.

In detail, the hinge cover part 140 according to the present embodiment may include a hinge cover body portion 141, a hinge binding portion 142, an elastic deformation recess portion 143, a first magnetic member 144, and a withdrawal groove sealing portion 145 having specific structures.

The hinge cover body portion 141 of the hinge cover part 140 has a structure that has an end corresponding to one end of each of the upper body part 110 and the lower body part 120 and surrounds the hinge portion of the to-be-mounted mobile phone. The hinge binding portion 142 has a configuration extending from one end of the hinge cover body portion 141 in an integral structure by a predetermined length, is mounted to be rotatable by a predetermined angle with respect to one end of the upper body part 110, and is made of a material having an elastic restoring force having a predetermined magnitude. The elastic deformation recess portion 143 may be formed in the outer surface of the hinge binding portion 142, may have a structure recessed by a predetermined depth, and may induce outward elastic deformation of the hinge binding portion 142. The first magnetic member 144 may have a configuration that is mounted on the other end of the hinge cover body portion 141, may be attached to a second magnetic member 125 mounted on one end of the lower body part 120 by a magnetic force, and may attach the hinge cover part 140 to the lower body part 120 in a detachable form. Further, the withdrawal groove sealing portion 145 may have a structure that extends from the other end of the hinge cover body portion 141 in an integral structure by a predetermined length and corresponds to a card withdrawal groove 126.

In this case, as illustrated in FIGS. 6 and 13, a hinge mounting groove 114 may be symmetrically formed on both sides of one end of the upper body part 110. The hinge mounting groove 114 may have a groove structure that is recessed by a predetermined depth and extends upward by a predetermined length and may have a structure that is bound to the hinge binding portion 142 in a form that may change a vertical position of the hinge binding portion 142 of the hinge cover part 140.

Further, the second magnetic member 125 may be mounted on one end of the lower body part 120. The second magnetic member 125 may be disposed at a position in contact with the first magnetic member 144 and may be a permanent magnet having a polarity different from that of the first magnetic member 144.

In this case, the card withdrawal groove 126 having a structure in which a portion of a user's finger may approach the card inlet port 131 to grip or come into contact with a portion of one end of the card may be formed at a position in close contact with the card inlet port 131 formed at one end of the lower body part 120. The card withdrawal groove 126 having this structure may have a structure corresponding to the withdrawal groove sealing portion 145.

Referring to these drawings, the foldable mobile phone case including the hinge cover body portion 141, the hinge binding portion 142, the elastic deformation recess portion 143, the first magnetic member 144, the second magnetic member 125, the withdrawal groove sealing portion 145, the hinge mounting groove 114, and a card withdrawal groove having specific structures can be provided, the mobile phone having the foldable central portion can be stably mounted thereon, the hinge part of the mobile phone can be stably protected even while a folding or unfolding motion is performed, and the card can be stably stored therein so that the card is not lost due to an unintentional external force.

As described above, since a foldable mobile phone case including a card storage structure according to the present disclosure and including an upper body part, a lower body part, a card storage part, and a hinge cover part having specific structures can be provided, a mobile phone having a foldable central portion can be stably mounted thereon, a hinge part of the mobile phone can be stably protected even while a folding or unfolding motion is performed, and a card can be stably stored therein so that the card is not lost due to an unintentional external force.

Further, since the foldable mobile phone case including a card storage structure according to the present disclosure and including an upper body part including an upper inner surface, a lens exposure portion, and a button exposure portion and a lower body part including a lower inner surface, a terminal exposure portion, a recessed groove, and a reinforcement portion having specific structures can be provided, a mobile phone having a foldable central portion can be stably mounted thereon, and a hinge part of the mobile phone can be stably protected even while a folding or unfolding motion is performed.

Further, since the foldable mobile phone case including a card storage structure according to the present disclosure and including a reinforcement body portion, a reinforcement extension portion, and a card separation prevention protrusion portion having specific structures can be provided, the card stored in the card storage part be prevented from being separated to the outside, the card storage part formed inside the lower body part can be stably supported due to an external force applied from the outside by reinforcing an internal structure of the lower body part, and as a result, the card stored in the card storage part can be stably stored and kept.

Further, since the foldable mobile phone case including a card storage structure according to the present disclosure and including a hinge cover body portion, a hinge binding portion, an elastic deformation recess portion, a first magnetic member, a second magnetic member, a withdrawal groove sealing portion, a hinge mounting groove, and a card withdrawal groove having specific structures can be provided, the mobile phone having the foldable central portion can be stably mounted thereon, the hinge part of the mobile phone can be stably protected even while a folding or unfolding motion is performed, and the card can be stably stored therein so that the card is not lost due to an unintentional external force.

In the above detailed description of the present disclosure, only specific embodiments thereof have been described. However, it should be understood that the present disclosure is not limited to particular forms mentioned in the detailed description, but rather, it should be understood that the present disclosure includes all modifications, equivalents, and substitutions within the spirit and scope of the present disclosure as defined by the appended claims.

That is, the present disclosure is not limited to the specific embodiments and descriptions described above, those skilled in the art to which the present disclosure pertains can implement various modifications without departing from the subject matter of the present disclosure as claimed in the appended claims, and such modifications may be present within the protection scope of the present disclosure.

What is claimed is:

1. A foldable mobile phone case comprising:
   an upper body part (110) having a structure that is mounted to surround an upper mobile phone portion (11), in which a camera lens is positioned, based on a foldable portion of a to-be-mounted mobile phone (10);
   a lower body part (120) having a structure that is mounted to surround a lower mobile phone portion (12) on another side, on which the upper body part (110) is not mounted, based on the foldable portion of the to-be-mounted mobile phone (10);
   a card storage part (130) having a structure which is recessed by a predetermined depth in the same shape as a card to be stored inside the lower body part (120) and in which a card inlet port (131) is formed at a position in contact with the upper body part (110); and
   a hinge cover part (140) having a structure that is mounted to be rotatable in one side direction by a hinge structure at a lower end of the upper body part (110), is mounted to surround a hinge part (13) of the mobile phone when the mobile phone is folded, and is rotated outward by a hinge structure and opens a hinge portion of the mobile phone when the mobile phone is unfolded,
   wherein the hinge cover part (140) includes:
   a hinge cover body portion (141) having a structure that has an end corresponding to one ends of the upper body part (110) and the lower body part (120) and surrounds the hinge portion of the to-be-mounted mobile phone;
   a hinge binding portion (142) that extends from one end of the hinge cover body portion (141) in an integral structure by a predetermined length, is mounted to be rotatable by a predetermined angle with respect to one end of the upper body portion (110), and is made of a material having an elastic restoring force having a predetermined magnitude;
   an elastic deformation recess portion (143) that is formed in an outer surface of the hinge binding portion (142), is recessed by a predetermined depth, and induces outward elastic deformation of the hinge binding portion (142);
   a first magnetic member (144) that is mounted on the other end of the hinge cover body portion (141), is attached to a second magnetic member (125) mounted on one end of the lower body part (120) by a magnetic force, and attaches the hinge cover part (140) to the lower body part (120) in a detachable form; and
   a withdrawal groove sealing portion (145) having a structure that extends from the other end of the hinge cover body portion (141) in an integral structure by a predetermined length and corresponds to a card withdrawal groove (126),
   the upper body part (110) includes a hinge mounting groove (114) that is symmetrically formed on both sides of one end of the upper body part (110), has a groove structure that is recessed by a predetermined depth and extends upward by a predetermined length, and has a structure that is bound to the hinge binding portion (142) in a form that changes a vertical position of the hinge binding portion (142) of the hinge cover part (140), and
   the lower body part (120) includes:
   a second magnetic member (125) that is mounted on one end of the lower body part (120), is disposed at a position in contact with the first magnetic member (144), and has a polarity different from that of the first magnetic member (144); and
   the card withdrawal groove (126) that is formed adjacent to the card inlet port (131) formed at one end of the lower body part (120).

2. The foldable mobile phone case of claim 1, wherein the upper body part (110) includes:
   an upper inner surface (111) having a structure that constitutes a storage space having a predetermined volume and is mounted to surround an upper portion of the to-be-mounted mobile phone;
   a lens exposure portion (112) having a structure in which a hole is formed to pass through one surface so that the camera lens of the to-be-mounted mobile phone is exposed to the outside; and
   a button exposure portion (113) having a structure in which a portion is formed to be recessed in one surface so that a button formed on a lateral side of the to-be-mounted mobile phone is exposed to the outside.

3. The foldable mobile phone case of claim 1, wherein the lower body part (110) includes:
   a lower inner surface (121) that constitutes a storage space having a predetermined volume and is mounted to surround a lower portion of the to-be-mounted mobile phone;
   a terminal exposure portion (122) having a structure in which a hole is formed to pass through one surface so that a charging terminal of the to-be-mounted mobile phone is exposed to the outside;
   a recessed groove (123) having a structure that extends in an extension lengthwise direction of the lower body part (120) along both sides of the card storage part (130) formed on the lower inner surface (121) and is recessed by a predetermined depth; and
   a reinforcement portion (124) having a structure that is fixedly seated on the recessed groove (123), extends to an edge of the lower inner surface (121), and surrounds a lower edge portion of the to-be-mounted mobile phone.

4. The foldable mobile phone case of claim 3, wherein the reinforcement portion (124) includes:
   a reinforcement body portion (124*a*) having a structure that is seated on the recessed groove (123);
   a reinforcement extension portion (124*b*) having a structure that is integrated with the reinforcement body portion (124*a*), extends to the edge of the lower inner surface (121), and surrounds the lower edge portion of the to-be-mounted mobile phone; and
   a card separation prevention reinforcement protrusion portion (124*c*) having a structure that is integrated with the reinforcement body portion (124*a*), extends inward form the card storage part (130) by a predetermined length, and presses and fixes both sides of a card stored in the card storage part (130).

\* \* \* \* \*